May 5, 1925.  1,536,896

L. M. LLORENS

TYPEWRITER FRICTION RAIL LUBRICATOR

Filed July 30, 1924

Inventor;
Louis M. Llorens:
By
Frederick E. Maynard
his Atty

Patented May 5, 1925.

1,536,896

UNITED STATES PATENT OFFICE.

LOUIS M. LLORENS, OF LOS ANGELES, CALIFORNIA.

TYPEWRITER-FRICTION-RAIL LUBRICATOR.

Application filed July 30, 1924. Serial No. 729,138.

*To all whom it may concern:*

Be it known that I, LOUIS M. LLORENS, a citizen of the Republic of Cuba, residing at Los Angeles, county of Los Angeles, California, have invented a new and useful Improvement in a Typewriter-Friction-Rail Lubricator, of which the following is a specification.

This invention relates to typewriting machines, and more particularly to Underwood typewriters.

The Underwood typewriter has a back rail which is called a "friction rail," and on this there slides, without any anti-friction devices, a pair of "friction bearings" which are a fixture with the carriage of the typewriter. Unless the friction rail is frequently lubricated very appreciable friction develops in the bearings and this makes it hard to throw the carriage to the right since this friction is added to the tension of the draw band.

My present invention has for an object to obtain a constantly effective lubricating means whereby to overcome the friction bearing friction to a material degree, to eliminate the necessity for almost daily application of oil, to prevent the accumulation of gum or other dried out deposit from oil on the rail, and to necessitate but an application of oil, say monthly.

A further object of the invention is to provide a lubricating means which may be initially built into the typewriter or which may be applied in a few moments by any one familiar with the machine, and this without any structural change whatsoever.

An additional object is to provide a lubricating device in the form of an attachment.

An object is to provide a lubricating means which is at once very simple, durable, has no working parts, and requires no special fastening means. And in this connection an object is to provide a lubricator of inexpensive form and which is combined with the carriage of the machine in such manner as to constantly wipe the friction rail as the carriage moves in either direction.

Further objects and advantages will be made manifest in the following specification of apparatus of my invention, one embodiment of which is illustrated in the accompanying drawing; it being understood that other modifications, variations and adaptations may be resorted to within the spirit of the invention and the scope thereof as here claimed.

The invention consists of means for accomplishing the objects desired.

Figure 1:
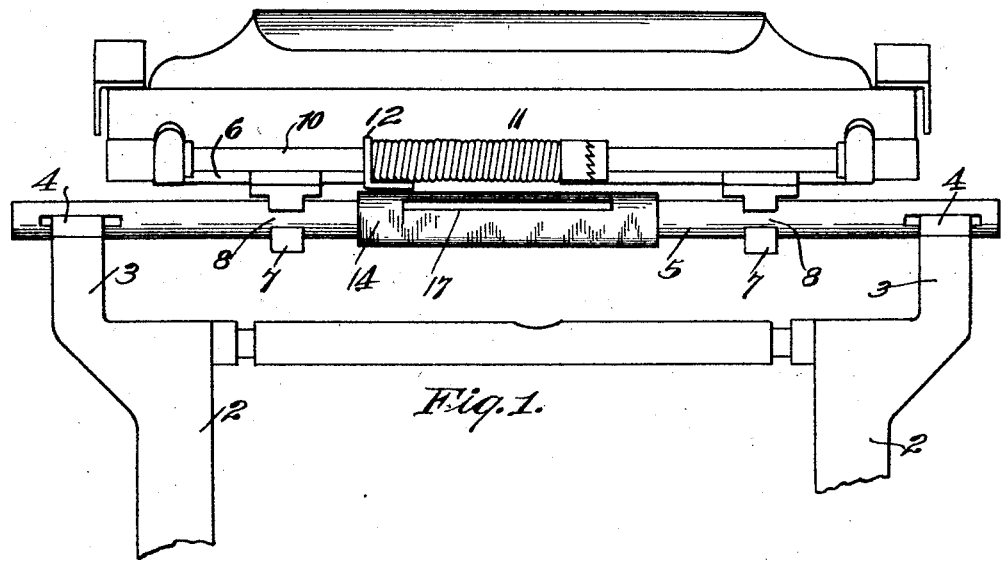
Fig. 1 is a rear elevation of a part of an Underwood typewriter, showing the invention applied.
Figures 3, 4:
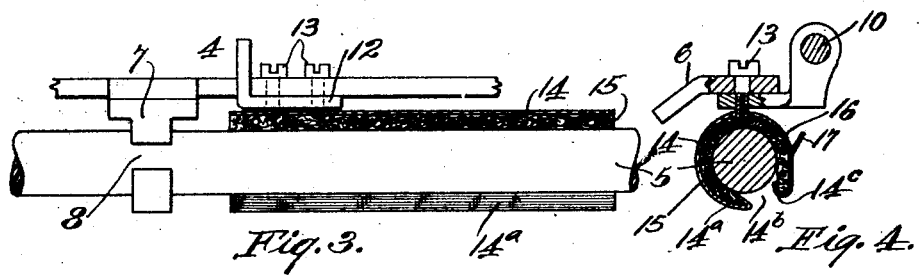
Fig. 3 is a detail longitudinal section of the lubricator as applied.
Fig. 4 is a section on line 4—4 of Fig. 3.
Figure 5:
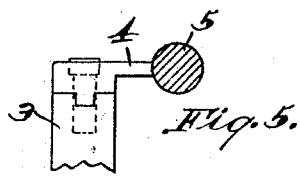
Fig. 5 is a sectional detail of the rail mounting.
Figure 2:
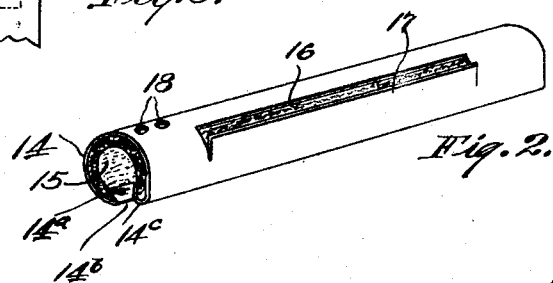
Fig. 2 is a perspective of the lubricator detached from the machine.

In the drawing is shown a part of the main frame 2 having up-standing corner posts 3 upon which are secured hangers 4 forming a part of the usual "friction rail" 5, upon which the rear portion of the carriage frame 6 is supported. The frame 6 is provided with spaced friction bearings 7 commonly split at 8 to clear the hangers 4 of the rail 5. The frame 6 is also provided with an oscillator arm rock shaft 10 having a helical spring 11 one end of which is attached to a bracket 12 the base of which is secured, as by screws 13, up against the bottom of the carriage frame 6. The screws 13 usually project slightly below the base of the bracket 12.

The bearings 7 present a large cylindrical area sliding on the rail and unless it is kept well lubricated much friction results and makes manual shift laborious, with a loss of speed.

My invention comprises means whereby the rail is kept constantly lubricated. The device, here shown, comprises a shell in which is retained an absorbent lining or oil reservoir in constant contact with the rail.

The shell is shown as a split cylinder 14, preferably formed of thin metal, having a lining of felt or other suitable material 15 to engage the rail 5. An edge of the slot of the shell is clinched down at 14ᵃ to bind on and hold the felt in place. The other edge of the slot 14ᵇ, along the shell, is hooked inwardly at 14ᶜ to receive the near edge of the felt without material compression and thus to obtain oil holding capacity. The felt will hold sufficient oil to ensure lubrication for a long period. Occasionally additional oil may be applied through an elongated aperture 16 presented at the outer and upper side of the shell when this is mounted on the rail 5. To provide a convenient guide along which to pass the spout of an oil can, the shell has an outbent lip or flange 17 along the lower side of the aperture 16.

To apply the lubricator it is only necessary to loosen and lift the friction rail 5 so that the shell 14 can, when the slot 14$^b$ is registered with the bracket 4, be slipped endwise onto the rail to a position beneath the base of bracket 12. In this position the screws 13 will project into small holes 18 provided therefor in the top of the shell 14, which has a diameter of such length as to accomplish this interlocking action. The screws 13 prevent end movement and rotation of the shell on the rail.

It will be seen that the lubricator moves with the carriage and keeps the rail well oiled between the bearings 7 which pick up oil and spread it to the limit of their movement on the rail.

What is claimed is:

1. In a typewriting machine, in combination, a friction rail, a platen carriage movable thereon, and a reciprocating oil reservoir having a part wiping on the rail to constantly lubricate the same.

2. In a typewriting machine, in combination, a friction rail, and means mounted thereon for lubricating the rail, and a carriage movable along the rail, and operatively attached to the said means.

3. In a typewriting machine, in combination, a friction rail, a carriage movable along the rail, and a lubricating device operative by the carriage and having a part wiping on the rail to supply lubricant to the same.

4. In a typewriting machine, in combination, a friction rail, a carriage movable along the rail, and a lubricating device mounted on the rail and operative by the carriage and having a part wiping on the rail to supply lubricant to the same.

5. A lubricator adapted for attachment to a typewriting machine carriage so as to move with the carriage thereof and having a part to wipe on the usual friction rail of the machine.

6. A lubricator for typewriting machines having a friction rail, comprising a shell having an oil holding lining adapted for arrangement on the rail, and for movement along the rail by the carriage of the typewriting machine.

7. A lubricator for typewriting machines having a friction rail, comprising an elongated shell having an oil holding pad engaging the rail, and means connecting the shell to the carriage of the typewriting machine so as to move the shell with the carriage.

8. A lubricator for the friction rail of a typewriting machine, comprising a split, generally cylindrical shell adapted to pass onto the rail, and having an oil retaining lining embracing the rail.

9. A lubricator for the friction rail of a typewriting machine, comprising a split, generally cylindrical shell adapted to pass onto the rail, and having an oil retaining lining embracing the rail, said shell being apertured to expose the lining for application of oil thereto.

10. A lubricator for the friction rail of a typewriting machine, comprising a split, generally cylindrical shell adapted to pass onto the rail, and having an oil retaining lining embracing the rail, the shell having holes to interlock with the usual spring bracket screws of the oscillator arm.

11. In a typewriting machine, in combination, a carriage, a friction rail, a bracket on the oscillator arm rock shaft, screws fastening the bracket to the carriage, and a shell mounted on the rail and engaging said screws to connect the shell and carriage, said shell having an oil holding lining engaging the rail.

12. A lubricating device for a typewriting machine friction rail, comprising an elongated shell applicable to the rail and having a porous lining, and a guide lip along the shell to support an applied oil can spout.

LOUIS M. LLORENS.